(12) United States Patent
Wattelet et al.

(10) Patent No.: US 6,824,906 B2
(45) Date of Patent: Nov. 30, 2004

(54) FUEL CELL SYSTEM INCORPORATING AND INTEGRATED CATHODE EXHAUST CONDENSER AND STACK COOLER

(75) Inventors: Jonathan P. Wattelet, Gurnee, IL (US); Mark C. Voss, Franksville, WI (US)

(73) Assignee: Modine Manufacturing Company, Racine, WI (US)

( * ) Notice: Subject to any disclaimer, the term of this patent is extended or adjusted under 35 U.S.C. 154(b) by 200 days.

(21) Appl. No.: 09/906,336

(22) Filed: Jul. 16, 2001

(65) Prior Publication Data

US 2003/0011721 A1 Jan. 16, 2003

(51) Int. Cl.[7] .............................. H01M 8/04; H01M 8/10
(52) U.S. Cl. .............................. 429/26; 429/13; 429/20
(58) Field of Search ................ 429/13, 26, 20

(56) References Cited

U.S. PATENT DOCUMENTS

| | | | | |
|---|---|---|---|---|
| 4,344,850 A | * | 8/1982 | Grasso | 210/664 |
| 5,200,278 A | * | 4/1993 | Watkins et al. | 429/24 |
| 5,863,671 A | | 1/1999 | Spear, Jr. et al. | |
| 6,171,718 B1 | | 1/2001 | Murach et al. | |
| 6,238,814 B1 | | 5/2001 | Horiguchi et al. | |
| 6,242,118 B1 | * | 6/2001 | Grasso et al. | 429/13 |

FOREIGN PATENT DOCUMENTS

| | | | |
|---|---|---|---|
| EP | 1083395 A1 | * 3/2001 | F25B/40/00 |
| JP | 07094202 | 4/1995 | |
| JP | 2000/156236 | 6/2000 | |

OTHER PUBLICATIONS

Ishizawa, M. et al, "Highly efficient heat recovery system for phosphoric acid fuel cells used for cooling telecommunication equipment", Journal of Power Sources, Elsevier Sequoia S.A. Lausanne, Ch, vol. 86, No. 1–2, Mar. 2000, pp. 294–297.

International Search Report dated Feb. 24, 2004.

* cited by examiner

*Primary Examiner*—Carol Chaney
(74) *Attorney, Agent, or Firm*—Wood, Phillips, Katz, Clark & Mortimer

(57) ABSTRACT

A fuel cell system (10) is provided and includes a fuel cell stack (11) and an integrated heat exchanger unit (12). The integrated heat exchanger unit (12) includes a fuel cell stack cooler (14) and a cathode exhaust gas condenser (16) arranged in a side-by-side relationship to be cooled by a common cooling air stream (18) that flows in parallel through the cooler (14) and the condenser (16).

4 Claims, 4 Drawing Sheets

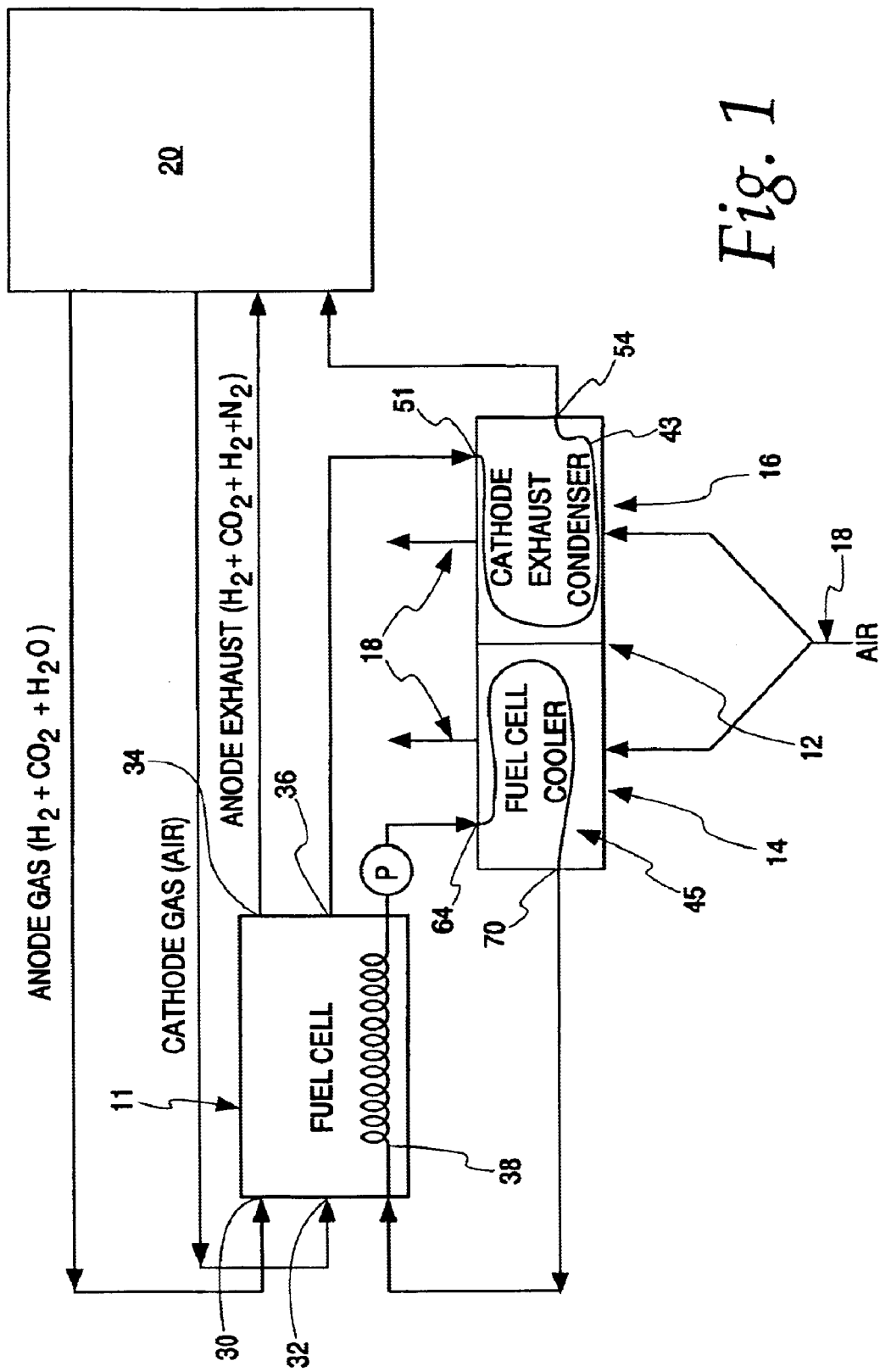

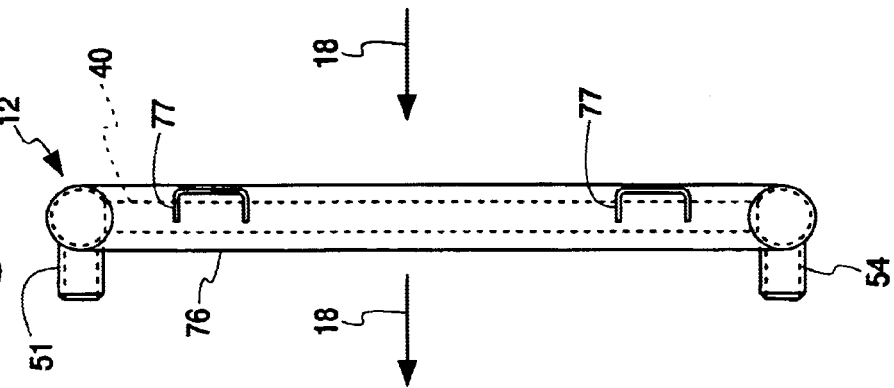
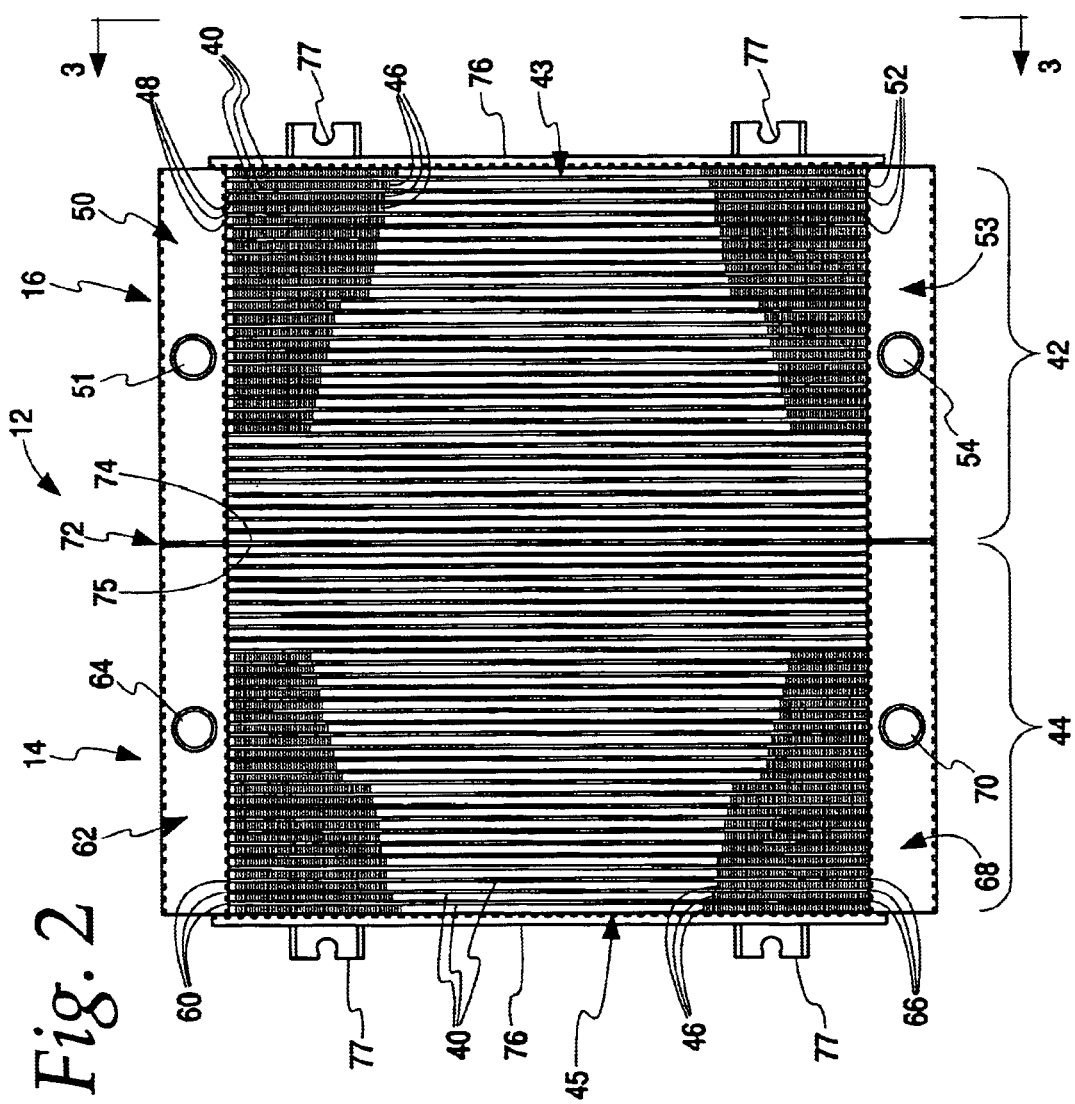

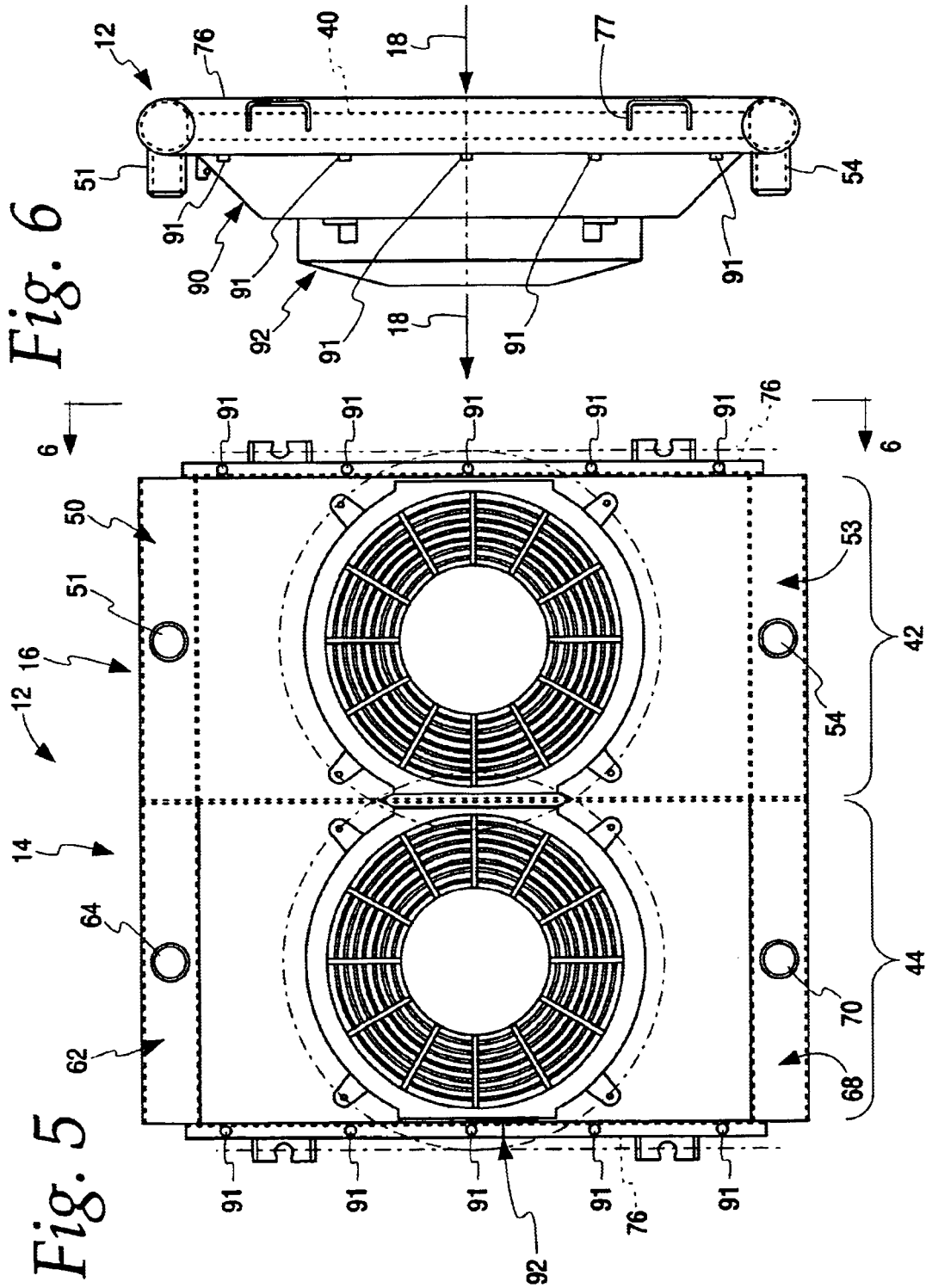

FUEL CELL SYSTEM INCORPORATING AND INTEGRATED CATHODE EXHAUST CONDENSER AND STACK COOLER

FIELD OF THE INVENTION

This application relates to fuel cell systems, and more particularly to fuel cell systems that include a cathode exhaust condenser and a stack cooler.

BACKGROUND OF THE INVENTION

Because fuel cells offer advantages in efficiency and in emission, interest in utilizing fuel cells as electricity generating plants and/or as a power source for vehicles has been increasing as concerns grow over the supply of fossil-fuel and the environmental effects of conventional fossil-fuel power sources, such as internal combustion engines for vehicles, has been increasing. However, improvements in affordability and compactness may be required before fuel cells become acceptable for wide spread usage, particularly in vehicles.

SUMMARY OF THE INVENTION

It is a primary objective of the invention to provide a new and improved fuel cell system.

It is another objective of the invention to provide a fuel cell system that can be made more affordable in comparison to conventional fuel cell systems.

It is another objective of the invention to provide a fuel cell system that can be made more compact in comparison to conventional fuel cell systems.

It is another objective of the invention to provide an improved fuel cell system that can be utilized in vehicular applications.

At least one of more of the above objectives is provided according to the invention in a fuel cell system that includes a fuel cell stack and an integrated heat exchanger unit. The fuel cell stack includes an anode gas inlet to receive a fuel flow, a cathode gas inlet to receive an oxygen flow, a cathode exhaust to discharge cathode exhaust gas, and a coolant passage to direct a coolant through the fuel cell stack.

In one form, the integrated heat exchanger unit includes a cathode exhaust condenser and a fuel cell stack cooler arranged in side-by-side relation to be cooled by a common cooling air stream that flows in parallel through the condenser and cooler. The condenser includes a condensation path in heat exchanger relation with the cooling air stream to reject heat from the cathode exhaust gas to the cooling air stream, a first inlet manifold in fluid communication with the cathode exhaust to receive cathode exhaust gas therefrom and connected to the condensation path to distribute the cathode exhaust gas thereto, and a first outlet manifold connected to the condensation path to receive the cathode exhaust gas therefrom. The fuel cell stack cooler includes a coolant path in heat exchange relation with the cooling air stream to reject heat from the coolant to the cooling air stream, a second inlet manifold in fluid communication with the coolant passage of the fuel cell stack to receive coolant therefrom and connected to the coolant path to distribute coolant thereto, and a second outlet manifold connected to the coolant path to receive the coolant therefrom and in fluid communication with said coolant passage of the fuel cell stack to direct coolant thereto.

In one form, the integrated heat exchanger unit further includes a common fan shroud attached to the condenser and the cooler to direct the cooling air stream from a fan system through the condenser and the cooler.

In one form, the condensation path and the coolant path include a plurality of parallel, spaced heat exchange tubes. The first and second inlet manifolds include a common inlet header tank connected to first ends of the heat exchange tubes, and a first baffle plate liquid tightly sealed in the common inlet header tank to prevent intermixing of the cathode exhaust gas and the coolant. The first and second outlet manifolds include a common outlet header tank connected to second ends of the heat exchange tubes, and a second baffle plate liquid tightly sealed in the common outlet header tank to prevent intermixing of the cathode exhaust gas and the coolant.

In one form, the integrated heat exchanger unit includes a plurality of spaced heat exchange tubes in heat exchange relation with a common cooling air stream, a common inlet header tank connected to first ends of the heat exchange tubes, a first baffle plate liquid tightly sealed in the inlet header tank to divide the inlet header tank into first and second inlet manifolds, a common outlet header tank connected to second ends of the heat exchange tubes, and a second baffle plate liquid tightly sealed in the outlet header tank to divide the outlet header tank into first and second outlet manifolds. The first inlet manifold is in fluid communication with the cathode exhaust to receive cathode exhaust gas therefrom and to distribute the cathode exhaust gas to a first set of the heat exchange tubes. The first outlet manifold receives the cathode exhaust gas from the first set of heat exchange tubes. The second inlet manifold is in fluid communication with the coolant passage of the fuel cell stack to receive coolant therefrom and to distribute the coolant to a second set of the heat exchange tubes. The second outlet manifold is in fluid communication with the coolant passage of fuel cell stack to direct coolant thereto from the second set of heat exchange tubes. The first and second sets of heat exchange tubes are arranged so that the common cooling air stream flows in parallel past the first set of heat exchange tubes and the second sets of heat exchange tubes.

Other objects and advantages will become apparent from the following specification taken in connection with the accompanying drawings and claims.

BRIEF DESCRIPTION OF THE DRAWINGS

FIG. 1 is a diagrammatic representation of a fuel cell system incorporating a fuel cell stack and an integrated heat exchanger unit embodying the present invention;

FIG. 2 is an elevation view of an integrated heat exchanger unit for use in the fuel cell system embodying the present invention;

FIG. 3 is a side view taken from line 3—3 in FIG. 2;

FIG. 5 is an elevation view of a fan shroud for use with the integrated heat exchanger units of FIGS. 2–4, and FIG. 6 is a view taken from line 6—6 and FIG. 5.

DETAILED DESCRIPTION OF THE PREFERRED EMBODIMENT

Figure 4:
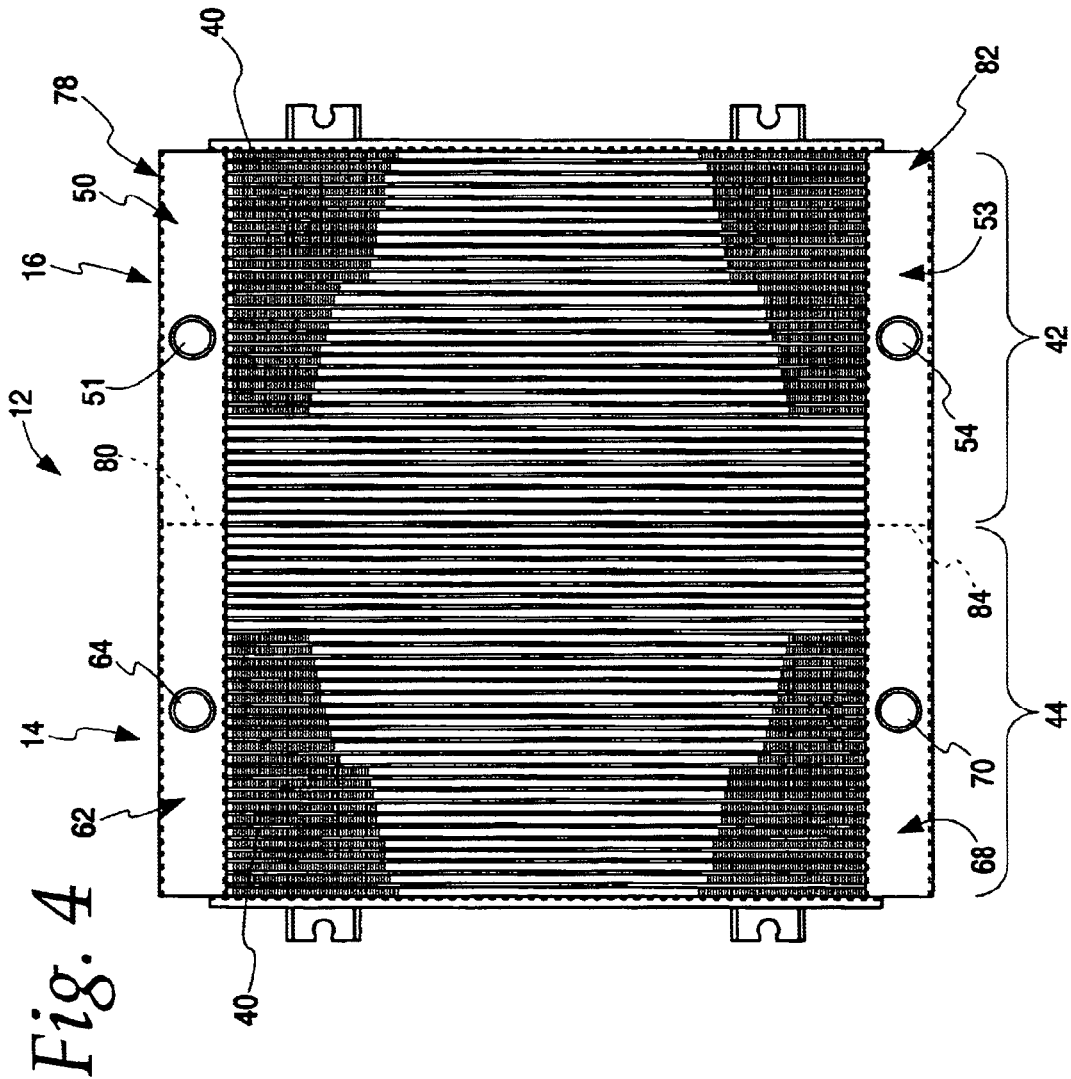
FIG. 4 is an elevation view of an alternate embodiment of an integrated heat exchanger unit for use in the fuel cell system embodying the present invention.

A fuel cell system 10 incorporating a fuel cell stack 11 and an integrated heat exchanger unit 12 embodying the invention is shown in the drawings in the form of a methanol reformer fuel cell system, such as is commonly proposed for use in vehicular applications. The integrated heat exchanger unit 12 includes a fuel cell stack cooler 14 and a cathode exhaust gas condenser 16 arranged in a side-by-side relationship to be cooled by a common cooling air stream, shown diagrammatically at 18, that flows in parallel through the cooler 14 and the condenser 16. While methanol is a preferred fuel in vehicular applications because it is easy to reform into the anode gas and because it can be made readily available to consumers, it should be understood that the invention will find use in the form of any fuel cell system that incorporates a cathode exhaust gas condenser and fuel cell stack cooler, including non-vehicular fuel cell applications. Accordingly, no limitation to a particular type of fuel cell system is intended unless specifically recited in the claims.

The remainder of the components that operate with the fuel cell system 10 are represented diagrammatically at 20. Because they are not critical to the understanding of the invention, and because there are many well known and conventional forms that can be used with the system 10, the components 20 are not illustrated in detail. For vehicular applications, the components 20 will typically include a water tank, a methanol tank, a fuel vaporizer, a reformer and catalytic burner, a gas purification reactor, and a compressor/expander, all of which are known. The water tank stores the system water and the water recovered from the cathode exhaust gas of the fuel cell stack 11. In typical operation, pumps that are electrically driven by a battery during start-up or by the electricity produced by the fuel cell stack 11 during operation meter water from the water tank and methanol from the methanol tank in a desired ratio to the fuel vaporizer were the water/methanol mixture vaporized. The vaporized mixture is delivered to the reformer and catalytic burner which in turn discharges reformate (hydrogen, water, carbon monoxide, and carbon dioxide) to a gas purification reactor that reduces the carbon monoxide content of the reformat to the point where it will not poison the fuel cell stack 11. The gas purification reactor discharges fuel in the form of an anode gas (hydrogen, carbon dioxide, and water) to the anode of the fuel cell stack 10. The compressor/expander expands exhaust gas from the fuel cell stack 11 and compresses air for delivery to the cathode of the fuel cell stack. Electric power generated by the fuel cell stack 11 is employed, during operation, to drive pumps, motors, etc. within the system as well as to provide electric power for the load to be driven by the system. For start-up, battery power may be used. In the case of vehicular propulsion systems, the load will typically be a motor coupled to the vehicle traction system.

The fuel cell stack 11 includes an anode gas inlet 30 for supplying fuel, typically a hydrogen laden anode gas, to the anodes of the fuel cell stack 11; a cathode gas inlet 32 for supplying oxygen, typically in the form of air, to the cathodes of the fuel stack 11; an anode exhaust 34 for exhausting gas from the anode of the fuel cell; a cathode exhaust 36 for exhausting cathode exhaust gas from the cathode of the fuel cell stack 11; and a coolant passage 38 for directing a coolant through the fuel cell stack 11 so that heat from the fuel cell stack 11 can be rejected to the coolant to maintain the fuel cell stack 11 at a desired operating temperature. As previously discussed, the invention will find use with any fuel cell stack that rejects heat to a coolant to achieve a desired temperature for the fuel cell stack. For example, the invention may find use with proton exchange membrane fuel cells, alkaline fuel cells, phosphoric acid fuel cells, solid oxide fuel cells, molten carbonate fuel cells, direct methanol fuel cells, and regenerative fuel cells. Because there are many known and conventional forms of such fuel cells for which the construction and operation are well known, and the particular details of the fuel cell stack 11 will be highly dependant upon the type of fuel cell selected and the operating parameters of the particular application, further description of the fuel cell stack 11 will not be provided herein for the sake of brevity.

FIGS. 2 and 3 shows one possible embodiment of the integrated heat exchanger unit 12. As previously discussed, the cooler 14 and condenser 16 are arranged in side-by-side relation to be cooled by the common cooling air stream, shown by arrow 18, that flows in parallel through the condenser 16 and the cooler 14. Typically in vehicular applications, the integrated heat exchanger unit 12 will be mounted in a location, such as the front of the vehicle, where the cooling air stream 18 can be provided, for at least part of the operating cycle, in the form of ram air generated by the vehicle's forward motion. The integrated heat exchanger unit 12 includes a plurality of heat exchange tubes 40 in heat exchange relation to the common cooling air steam 18, with one set 42 of the tubes 60 defining a condensation path 43 for the cathode exhaust gas condenser 16, and another set 44 of the tube 40 defining a coolant path 45 for the fuel cell stack cooler 14. In the illustrated embodiment of the integrated heat exchanger unit 12, the tubes 40 are spaced in a side-by-side relation, parallel to each other with serpentine fins 46 located in the spaces between adjacent pairs of the tubes 40. The tubes 42 have ends 48 that are connected to an inlet manifold 50 of the condenser 16 which is in fluid communication with the cathode exhaust 36 to receive cathode exhaust gas therefrom via an inlet port 51 and to distribute the cathode exhaust gas into the tubes 42. The tubes 42 have their other ends 52 connected to an outlet manifold 53 of the condenser 16 which receives the cathode exhaust gas and condensate from the tubes 42 and directs the same from an outlet port 54 to the system 10. Similarly, the tubes 44 have ends 60 connected to an inlet manifold 62 of the cooler 14 which is in fluid communication with the coolant passage 38 to receive coolant therefrom via an inlet port 64 and to distribute the coolant to the interior of the tubes 44. The tubes 44 have opposite ends 66 that are connected to an outlet manifold 68 that is in fluid communication with the coolant passage 38 to direct coolant thereto from the tubes 42 through an outlet port 70.

In the illustrated embodiment, the condenser 16 and cooler 14 are joined at their interface 72 which is defined by a pair of plates 74, 75 that are structurally bonded by a suitable technique, such as brazing, epoxy, or welding. The plates 74, 75 extend over the entire height of the integrated heat exchanger unit 12. The integrated heat exchanger unit 12 also includes a pair of side plates 76 in the form of U-shaped channels that are structurally connected to the manifold 50, 53, 62 and 68 to provide structural support and stiffness for the integrated heat exchanger unit 12, and to provide structural support for a plurality of mount brackets 77 that are used to mount the integrated heat exchanger unit 12 to structures associated with the system 10.

As seen in FIG. 4, an alternate construction is possible wherein the integrated heat exchanger unit 12 includes a common, inlet header tank 78 with a baffle 80 liquid tightly sealed in the inlet header tank 78 to separate the inlet manifolds 50, 62 of the condenser 16 and cooler 14 to thereby preventing intermixing of the cathode exhaust gas and the coolant. Similarly, the integrated heat exchanger unit 12 includes a common outlet header tank 82 with a second baffle plate 84 liquid tightly sealed in the header tank 82 to separate the outlet manifolds 53, 68 of the condenser 16 and the cooler 14 to thereby prevent intermixing of the cathode exhaust gas in the coolant. As another option, the plates 74, 75 may be eliminated from this construction. While a one piece, cylindrical tank construction is shown for each of the header tanks 78, 82, it should be understood that there are a number of well known constructions for heat exchanger header tanks which may be utilized in the integrated heat exchanger unit 12. For example, the tanks 78, 82 could be formed from a header plate that receives the ends of the tubes, with a separate tank plate brazed to the header plate to form the manifolds 50, 53, 60, 68. Additionally, the tank 78 may employ a different construction then the tank 82. Furthermore, there are many known forms of baffle plates 80, 84 that may be utilized in the header tanks 78, 82, depending upon the particular construction of the header tanks. Accordingly, further description of these components will not be provided herein for the sake of brevity.

While the illustrated embodiment of the integrated heat exchanger unit 12 is shown with flat tubes arranged in a parallel flow type construction, it may be advantageous in some applications for other types of tubes, and arrangement of tubes, to be utilized as long as the condenser 16 and cooler 14 are arranged in side-by-side relation so that the common air stream 18 flows in parallel through the condenser 16 and cooler 14. For example, it may be advantageous in some applications to utilize round tubes, plate fins, and/or a serpentine tube arrangement for one, or both of the condenser 16 and the cooler 14. Similarly, while the condenser 16 and the cooler 14 are shown as being equal in size, with the same number and size of the tubes 40, it should be understood that the relative sizing of the condenser 16 and the cooler 14 can vary and will be dependent upon the parameters of the specific application.

As shown in FIGS. 5 and 6, the integrated heat exchanger unit 12 may also include a common fan shroud 90 that is attached to the condenser 16 and the cooler 14 to direct the air stream 18 between the condenser 16 and the cooler 14 and a fan system 92. While any suitable attachment may be used, the common fan shroud 90 in the illustrated embodiment is connected by a plurality of fasteners 91 to the side plates 76. In the illustrated embodiment, the fan system 92 is provided by a pair of fans that draw the air stream 18 through the condenser 16 and the cooler 14. However, it should be understood that in some applications it may be advantageous for the fan system 92 to include just a single fan that would draw the air stream 18 through the condenser 16 and the cooler 14. Similarly, while the illustrated embodiment shows the fan system 92 mounted on the fan shroud 90, it may be advantageous in some embodiments for the fan system 92 to be mounted on other structures associated with the system 10.

It should be appreciated that the system 10 can provide increased compactness compared to conventional fuel cell systems by combining the cathode exhaust gas condenser 16 and the fuel cell stack cooler 14 into the integrated heat exchanger unit 12. Similarly, it should be appreciated that the system 10 can provide reductions in cost in comparison to conventional fuel cell systems because the integrated heat exchanger unit 12 can require fewer parts and simplified mounting in comparison to more conventional constructions. Further, it should be appreciated that by using a common air stream 18, the integrated heat exchanger unit 12 can provide increased efficiency in comparison to more conventional constructions which may require separate air streams or other cooling fluids. Furthermore, the single air stream 18 provides advantageous for packaging the fuel cell system 10 in vehicular applications, as does the integrated heat exchanger unit 12 which can minimize the space and the mounting points required for the condenser 16 and the cooler 14.

What is claimed is:

1. A fuel cell system, the system comprising:

a fuel cell stack including an anode inlet to receive a fuel flow, a cathode inlet to receive an oxygen flow, a cathode exhaust to discharge cathode exhaust gas, and a coolant passage to direct a coolant through the fuel cell stack; and an integrated heat exchanger unit including a cathode exhaust condenser and a fuel cell stack cooler arranged in side-by-side relation to be cooled by a common cooling air stream that flows in parallel through said condenser and cooler;

said condenser including a condensation path in heat exchange relation with the cooling air stream to reject heat from the cathode exhaust gas to the cooling air stream, a first inlet manifold in fluid communication with the cathode exhaust to receive cathode exhaust gas therefrom and connected to the condensation path to distribute the cathode exhaust gas thereto, and a first outlet manifold connected to the condensation path to receive the cathode exhaust gas therefrom;

the fuel cell stack cooler including a coolant path in heat exchange relation with the cooling air stream to reject heat from the coolant to the cooling air stream, a second inlet manifold in fluid communication with the coolant passage of the fuel cell stack to receive coolant therefrom and connected to the coolant path to distribute the coolant thereto, and a second outlet manifold connected to the coolant path to receive the coolant therefrom and in fluid communication with said coolant passage of the fuel cell stack to direct coolant thereto.

2. The fuel cell system of claim 1 wherein said integrated heat exchanger unit further comprises a common fan shroud attached to said condenser and said cooler to direct the cooling air stream from a fan system through the cathode exhaust condenser and the fuel cell stack cooler.

3. A fuel cell system, the system comprising:

a fuel cell stack including an anode inlet to receive a fuel flow, a cathode inlet to receive an oxygen flow, a cathode exhaust to discharge cathode exhaust gas, and a coolant passage to direct a coolant through the fuel cell stack;

an integrated heat exchanger unit including a cathode exhaust condenser and a fuel cell stack cooler arranged in side-by-side relation to be cooled by a common cooling air stream that flows in parallel through said condenser and cooler;

said condenser including a condensation path in heat exchange relation with the cooling air stream to reject heat from the cathode exhaust gas to the cooling air stream, a first inlet manifold in fluid communication with the cathode exhaust to receive cathode exhaust gas therefrom and connected to the condensation path to distribute the cathode exhaust gas thereto, and a first outlet manifold connected to the condensation path to receive the cathode exhaust gas therefrom;

the fuel cell stack cooler including a coolant path in heat exchange relation with the cooling air stream to reject heat from the coolant to the cooling air stream, a second inlet manifold in fluid communication with the coolant passage of the fuel cell stack to receive coolant therefrom and connected to the coolant path to distribute the coolant thereto, and a second outlet manifold connected to the coolant path to receive the coolant therefrom and in fluid communication with said coolant passage of the fuel cell stack to direct coolant thereto; wherein said condensation cooling path and said coolant path comprise a plurality of parallel, spaced heat exchange tubes;

said first and second inlet manifolds comprise a common inlet header tank connected to first ends of said heat exchange tubes, and a first baffle plate liquid tightly sealed in said common inlet header tank to prevent intermixing of said cathode exhaust gas and said coolant; and said first and second outlet manifolds comprise a common outlet header tank connected to second ends of said heat exchange tubes, and a second baffle plate liquid tightly sealed in said common outlet header tank to prevent intermixing of said cathode exhaust gas and said coolant.

4. A fuel cell system, the system comprising:

a fuel cell stack including an anode inlet to receive a fuel flow, a cathode inlet to receive an oxygen flow, a cathode exhaust to discharge cathode exhaust gas, and a coolant passage to direct a coolant through the fuel cell stack; and an integrated heat exchanger package including a plurality of spaced heat exchange tubes in heat exchange relation with a common cooling air stream, a common inlet header tank connected to first ends of the heat exchange tubes, a first baffle plate liquid tightly sealed in the inlet header tank to divide the inlet header tank into first and second inlet manifolds, a common outlet header tank connected to second ends of the heat exchange tubes, and a second baffle plate liquid tightly sealed in the outlet header tank to divide the outlet header tank into first and second outlet manifolds, the first inlet manifold in fluid communication with the cathode exhaust to receive cathode exhaust gas therefrom and to distribute the cathode exhaust gas to a first set of said heat exchange tubes, the first outlet manifold to receive the cathode exhaust gas from said first set of heat exchange tubes, the second inlet manifold in fluid communication with the coolant passage of the fuel cell stack to receive coolant therefrom and to distribute the coolant to a second set of said heat exchange tubes, and the second outlet manifold in fluid communication with said coolant passage of the fuel cell stack to direct coolant thereto from said second set of heat exchange tubes, and said first and second sets of heat exchange tubes arranged so that the common cooling air stream flows in parallel past said first and second sets of heat exchange tubes.

* * * * *